Figure 1:
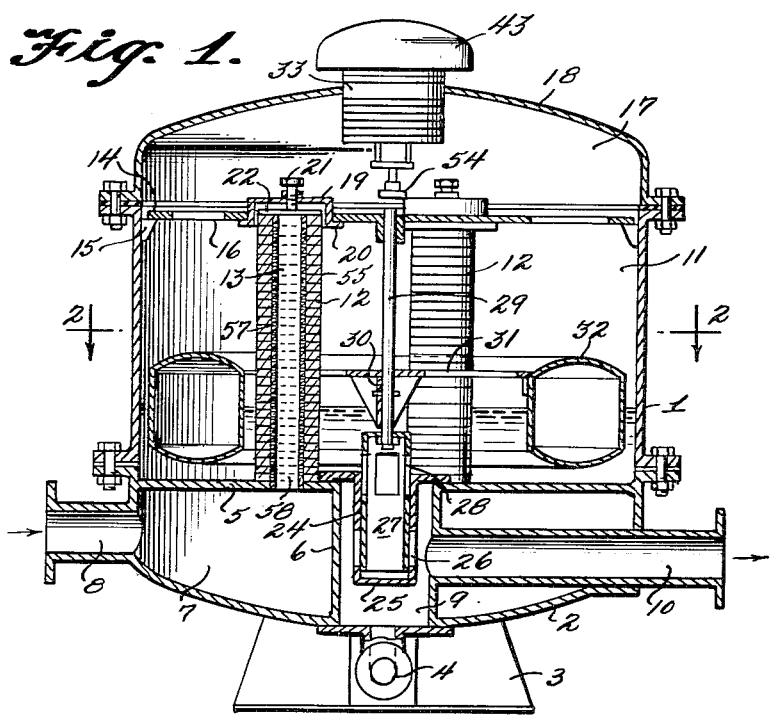

Oct. 15, 1957  J. MULLER  2,809,712
GAS AND LIQUID SEPARATOR
Filed Jan. 18, 1956  3 Sheets-Sheet 1

INVENTOR
JACQUES MULLER

ATTORNEYS

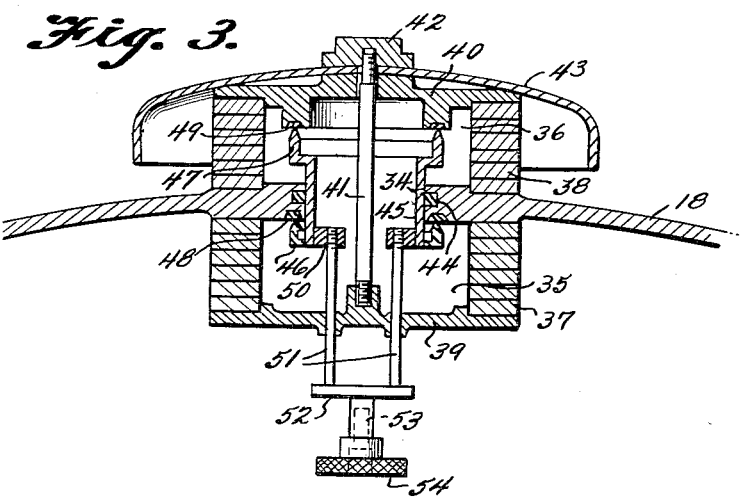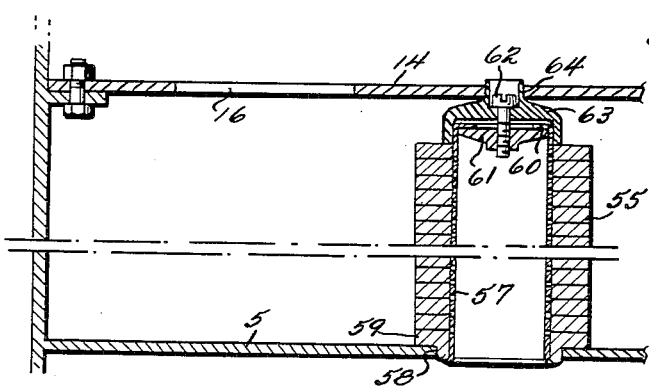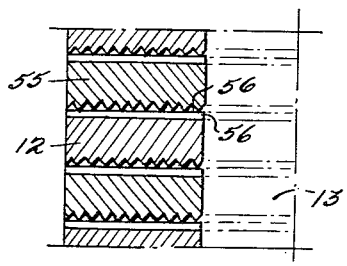

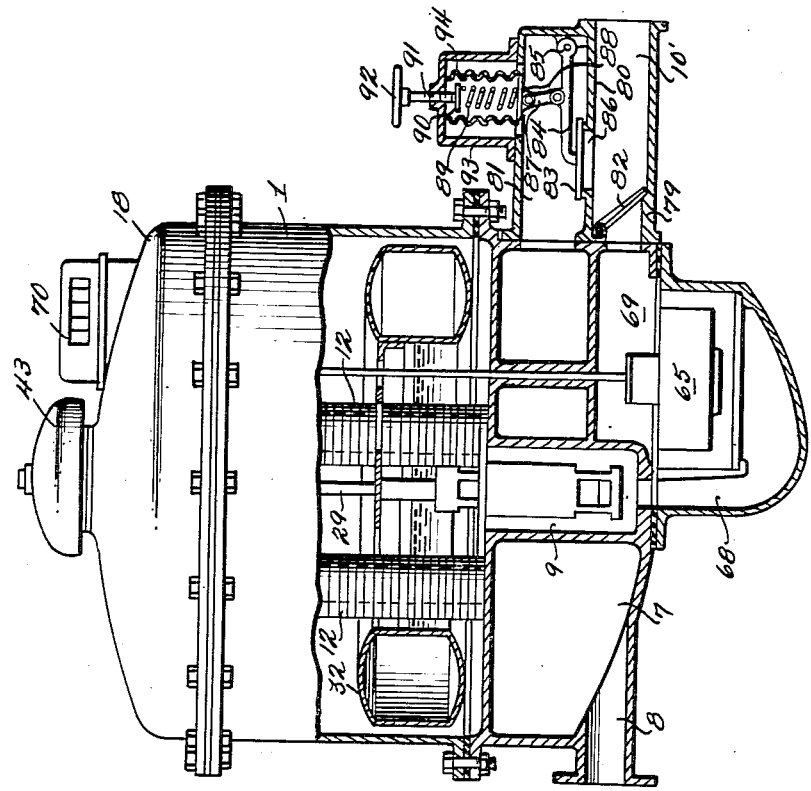

United States Patent Office 2,809,712
Patented Oct. 15, 1957

2,809,712
GAS AND LIQUID SEPARATOR
Jacques Muller, La Garenne-Colombes, France
Application January 18, 1956, Serial No. 559,990
Claims priority, application France January 19, 1955
5 Claims. (Cl. 183—2.5)

When it is desired to obtain an exact indication in the measure of a quantity of liquid supplied through a meter, it is obviously necessary that the liquid contains the minimum of included gas. Now, frequent agitation to which a liquid is subjected in pumping, filtering, etc. causes it to entrain air which falsifies the measurement of the volume supplied. This is particularly so in the case of gasoline pumped into a storage tank when there is interposed at the inlet of the tank a meter for measuring volume.

The object of this invention is to provide a separator for gas and liquid adapted to be placed immediately upstream of or ahead of a volume measuring meter located in a conduit supplying gasoline.

According to the invention the separator comprises a reservoir adapted to be interposed in a conduit for liquid and comprising below a horizontal separating partition an inlet chamber for liquid to which leads an upstream or supply conduit, and above this partition a reserve chamber from which leads a downstream or discharge conduit. The reserve chamber has at a high point an air outlet and contains a certain number of separating columns or cartridges each formed of a stack of rings or annular discs having their surfaces provided with shallow grooves which form narrow channels between the interior space of the column or cartridge, in communication through the inlet chamber with the upstream or supply conduit, and the space in the reserve chamber which is in communication with the downstream or discharge conduit. The reserve chamber contains a float actuating a valve, not influenced by the pressure for the outflow of liquid, and a valve, not influenced by pressure for the outflow of air, for closing the first valve in a low position of the float, and the second valve, in a high position of the float.

The invention contemplates more particularly the application of this separator in an installation for the storage of liquid fuel and especially gasoline. In this application the air flow valve is enclosed on one side and the other of the upper wall of the separator in which it is mounted, by a flame arresting wall formed of a stack or pile of rings having their surfaces provided with shallow grooves which form narrow channels between the space in which the valve is located and the interior atmosphere of the separator on one hand and the external atmosphere on the other hand. The volumetric meter is preferably incorporated in the separator. A relief valve with an adjustable spring is associated with the meter in a bypass between the meter outlet and the inlet chamber of the separator to protect the meter from shocks or hydraulic recoil due to the closure of a downstream stop valve.

The separator is preferably situated between an upstream filtering device and a downstream stop valve and the invention equally contemplates the process which consists in utilizing the pressure, resulting in the separator from the closure of the air overflow, due to the rise in level of the gasoline accumulated in the separator as a result of the closure of the downstream valve, to force the liquor counter-currently through the filtering device, for the purpose of cleaning the latter.

The invention will now be described with reference to the accompanying drawings which show several embodiments thereof.

Figure 2:
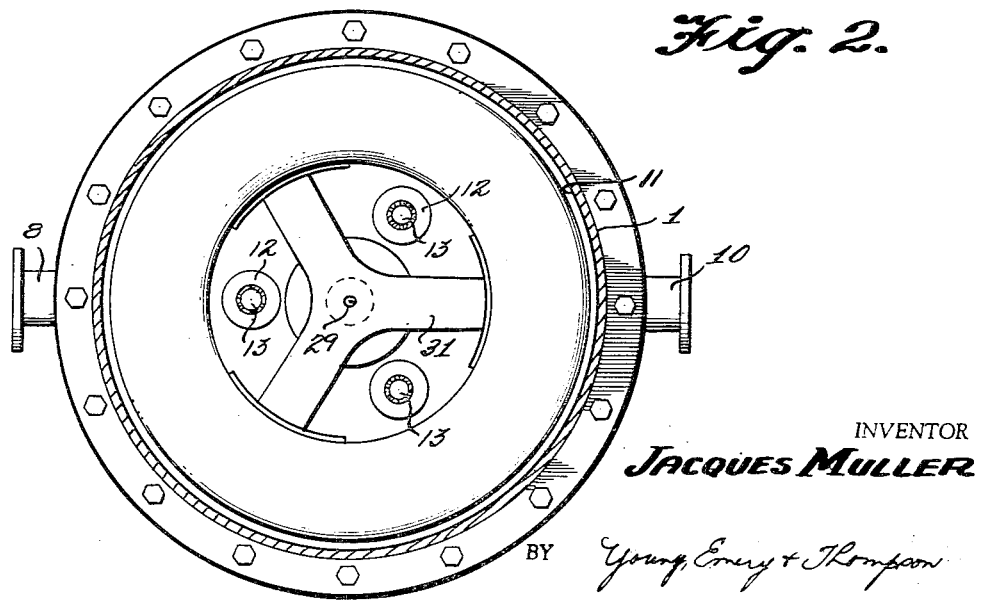

In the drawings:
Figure 1 is a vertical sectional view of a separator according to the invention;
Figure 2 is a corresponding horizontal sectional view taken on line 2—2 of Figure 1;
Figure 3 is a detail view in axial section of the device for removal of air outside the separator;
Figure 4 is a detail view of the mounting of a separating column included in the separator;
Figure 5 shows on a larger scale a partial radial sectional view of a part of the wall of this column;
Figure 6 is an elevational view partly in section showing a separator according to the invention incorporating a meter;
Figure 7 is a view similar to Figure 6 showing a modified form of separator incorporating such a meter.

The body of the separator according to this invention comprises a cylindrical drum 1 with its axis arranged vertically and positioned between hollow top and bottom members to which it is tightly connected by flanges. The lower or bottom member 2 is supported on a base 3 of sufficient height to clear or free a discharge pipe 4. Member 2 is provided substantially at the level of its connecting flange with a horizontal partition or top wall 5 connected at its central portion to the bottom wall by a cylindrical wall 6, of a well 9. There are thus formed two chambers, one of annular shape 7 being the inlet chamber to which is connected the inlet pipe 8 for the liquid and the other a central chamber 9 being the outlet chamber from which leads a pipe 10 for the discharge of the liquid.

The part of the separator corresponding to the height of the drum 1 above the wall or partition 5, forms a reserve chamber 11 containing in its central region a certain number of separating columns or cartridges 12, three being shown in the example represented, disposed in triangular formation about the vertical axis of the separator. These columns are composed each of superposed annular elements which will be described hereinafter, adapted to provide radial passages between, on the one hand, the cylindrical chamber 13 formed by these annular elements, which communicates with the inlet chamber 7 through an opening 58 in the partition 5, and on the other hand, the capacity or space in the reserve chamber 11.

In the form of construction shown in Figure 1 these separator columns 12 are held at their upper end, in a partition 14 which is fixed on brackets 15 of the wall of the casing 1 and is provided with openings 16 for communication between the chamber 11 and a chamber 17 defined by the hollow upper member 18. Each column 12 is capped by a closure having an upper portion 19 extending through an opening in the partition 14 and its rim 20 held under the same. A screw 21 traverses the top of the closure 19 and bears on a disc 22 covering the upper annular member to press the pile of the discs on the partition 5.

The upper end of the well 9 of the lower member 2 is covered by a flange 23 of a cylinder 24, having a solid or imperforate bottom 25 but having lateral ports 26 near its bottom providing communication between the cylinder 24 and the outlet chamber 9 formed by the well. This cylinder 24 contains a cylindrical piston or slide 27 open at its bottom but having its lateral wall solid or imperforate at the lower portion thereof so as to close the ports 26 when the piston 27 is in its lowest position. Piston 27 is provided with lateral openings 28 in its upper portion, these openings remain uncovered by the wall of cylinder 24 at least partly when the piston is in its lowest position. The pressures on the piston are equalized so that they have no influence on its operation. The piston 27 is attached at its upper end to an axial rod 29 guided in the partition 14 so that it may slide vertically. To this rod is fixed a hub 30 with radial arms 31 fixed to a toroidal float 32 surrounding the separating columns 12, the arms 31 passing between the latter.

The upper member 18 of the separator comprises an air outlet device 33 which will now be described with reference to Fig. 3. Axially of the separator the upper wall of the member 18 is provided with a cylindrical orifice 34 affording communication between two spaces 35 and 36 defined on opposite sides of the top wall of the member 18 by cylindrical walls 37 and 38 formed of stacks of annular members provided with thin passages between them and pressed against the opposite sides of the wall of member 18 by two opposed end plates 39 and 40 connected by a threaded rod 47, the clamping being ensured by a nut 42 bearing on a bell 43 covering with a wide projection the exterior pile 38. In the opening 34 of the top of member 18 is slideably mounted the tubular body 45 of an annular valve comprising two valve heads 46, 47 of ring formation, the interior head being engageable on a seat 48 in the lower surface of the top of the member 18, and the outer head being engageable with a seat 49 of the lower surface of the plate 40. A packing member 44 is provided in a groove in the wall of the orifice 34 to form a tight joint with the valve body 45. The pressures on this valve balance each other and do not influence its operation. In lugs 50 inside the said valve body are symmetrically screwed two rods 51 parallel to the axis sliding through the plate 39 and held like the arms of a stirrup in a crosshead 52 which carries an axially extending threaded rod 53. On this rod is engaged by a knurled nut 54 serving as an adjustable abutment for the rod 29 of the float (not shown in Figure 3, but see Figure 1).

The construction or formation of the thin passages provided between the annular members forming the walls of the separating columns 12 as well as the walls 37 and 38 of the air outlet device is shown in Figure 5. The superposed elements are solid rings 55 in the parallel flat faces of which are cut grooves 56 parallel and for example of triangular cross-section extending in different directions in each surface. The stacking of the rings 55 thus gives rise to the formation between them of crossed parallel channels forming thin passages between the interior space (13 for example) and the exterior space (11 for example).

In a modification of the mounting of the separating columns shown in Fig. 1 the rings 55 are mounted on a perforated tube 57 the lower end of which engages in the orifice 58 of the partition 5 and the upper end of which is integral with the clamping plate 22. In the modification shown in Fig. 4 the perforated tube 57 is fixed at its base in a seating ring 59 centered in the orifice 58 of the partition 5 and is provided at its upper end with an inwardly extending rim or flange 60 engaging a plate 61 suspended by a clamping screw 62. This screw traverses the bottom of a bell 63 the edge of which bears on the upper ring 55 and which carries an axial boss 64 engaged in an opening in the partition 14. The head of the screw 62 is supported on the bell 63 in the bottom of a recess provided in the boss 64. The tightening of this screw to lower the bell 63 relatively to the plate 61 causes the plate to abut against the rim or flange 60 of the perforated tube 57 which is held at its base, thus assuring clamping of the rings 55.

The operation of the separator will now be described, assuming its application to an installation for storage of gasoline. It is then interposed between pumps and the storage tank and downstream of a filtering device and upstream of a stop valve. A meter for measuring the volume of gasoline fed to the tank is arranged between the separator and the valve in close proximity to the separator. This meter which may be of any type is not shown in Fig. 1 nor are the other parts of the installation.

The gasoline fed by the pumps through the filter device enters in the inlet chamber 7. It rises in the separating columns 12 and then flows through the thin passages between the rings or annular discs. It undergoes a straining in these passages which favors the separation of air entrained in the gasoline particularly in the form of foam caused by the mixing of the gasoline with air upstream of the separator.

The gasoline trickles over the outer surface of the columns 12 and collects in the reserve chamber 11.

At the beginning of filling the level of the liquid not being high in this chamber, the float 32 is in its low position and the outflow valve 27 is in its closed position. The gasoline enters into the piston valve through its ports 28 but is stopped by the wall of the piston which closes the outlet ports 26. The float 32 being in its low position the central rod 29 is not in contact with the stirrup of the air outlet valve and the latter is in its low position placing the interior of the separator in communication with the free air through the walls 37 and 38 of the two air outlet chambers communicating through the body of the valve. The air separated from the gasoline during the flow through the thin passages provided in the walls of the separator columns 12, rises in the chamber 11, passes through the openings 16 and enters in the air discharge device, the valve of which is open and evacuates to the free air. The air thus evacuated to the atmosphere is freed from drops of gasoline which it may entrain by its passage through the thin channels of the wall 37. Nevertheless it may contain a certain quantity of gasoline vapors which in unfavorable circumstances could form an explosive mixture. The arrangement of the outlet passages in the form of multiple channels of minute cross-section, constitute a safeguard since it prevents transmission of external flame to the liquid fuel contained in the separator.

When the delivery of gasoline into the separator has sufficiently raised the level of the liquid and the float 32 so that the piston 27 uncovers the outlet ports 26, the liquid will flow into the outlet chamber 9 and from there through the pipe 10 into the outlet conduit, through the meter and the stop valve and into the tank. The meter readings are not falsified by the presence of entrained air since this has been eliminated.

It will be noted that the flow towards the tank is produced by raising of the piston or slide valve 27 before the central rod 29 has engaged the stirrup of the air outlet valve and has raised it sufficiently to close this valve. The internal pressure in the separator is favored by the expansion of the liquid flowing under pressure which occurs at the outlets of the separating columns 12. The delivery of the gasoline leaving the separator normally takes place by gravity or under pressure of the pump after the air outlet valve closes.

When the downstream valve is closed to stop the flow towards tank, the delivery from the outlet of the separator is stopped but, as the upstream delivery pumps continue in operation, the level of the liquid in the separator continues to rise. The central rod 29 rising with the float 32 moves the outlet valve to its position of closure in which its two rings or heads 46 and 47 are applied against the seats 48 and 49 (Fig. 3). Then the interior atmosphere of the separator is isolated or shut-off from the exterior and the pressure rises in the separator up to that of the pumping pressure. This pressure rises and, by known means, controls the by-passing of the pumps. The pumps can be stopped by any means either manual or automatic.

The high internal pressure thus created in the separators can be used for clearing or cleaning the upstream filter devices by counterflow if after stoppage of the pumps the liquid is given an opportunity to be discharged upstream of the filters. The counterflow will persist as long as this upstream discharge passage remains open or the level of the liquid in the separator is not lowered sufficiently to reopen the air discharge valve. This reopening will occur when the interior pressure has fallen to atmospheric valve and the valve is balanced with respect to upstream and downstream pressures.

In the form of construction shown in Figs. 6 and 7 the separator is similar to that shown in Fig. 1 but the meter for measuring the volume of gasoline discharged, instead of being arranged in the conduit immediately downstream of the separator as in the first embodiment, is incorporated in the separator itself in the passage for discharge of the liquid from the central well 9.

In the form of construction shown in Figure 6 the measuring mechanism 65 of the meter is positioned in a cavity 66 of a casing 67 flanged against a flat surface of the underneath of the lower member 2. The liquid outlet conduit 68 extends from the bottom of the central well 9 to the said cavity upstream of the meter. On the downstream side of the meter the member 2 is provided with a chamber 69 communicating with the discharge pipe 10. This chamber is traversed by the drive shaft which is connected through bevel pinions 71 with the rotating shaft 72 of the measuring mechanism and drives the counter 70.

Since the chamber 69 is normally filled with liquid and the dial of the meter is outside, the drive shaft has to pass through a sealing device which has the drawback of creating friction and risk of air entering. To avoid this the drive shaft may be in two parts 73 and 74 in alignment, the two adjacent ends of the shaft terminating in two face to face magnetic members 75, 76 located on opposite sides of a diaphragm 77 which divides into two isolated spaces a compartment 78 fixed in the chamber 69. The space in which the magnetic member 76 of the outer part 74 of the drive shaft rotates is thus totally isolated from the other space into which the liquid of the chamber can penetrate through the bearing for this part of the shaft.

The meter may also be placed on the upper member 18 of the separator as indicated at 70A and connected to its measuring mechanism by a vertical shaft 72A extending up through the separator.

In the modification shown in Figure 7, the last mentioned arrangement of the dial is adopted. There is also provided a buffer or anti-water hammer device to avoid shock from hydraulic recoil on the meter mechanism due to sudden stoppage of the flow of the liquid when the downstream stop valve is closed. This device comprises a body 79 flanged to a lateral plane surface of the lower member 2 of the separator, and divided by a partition 80 into two parts, one serving as an outlet pipe 10' communicating with the outlet chamber 69 of the meter, the other part 81 communicating with the inlet chamber 7 of the separator. At the exit of the outlet chamber 69 the body 79 contains a one-way or check valve 82 which closes when the pressure upstream no longer exceeds the downstream pressure, i. e., upon closure of the downstream valve. The upper chamber 81 contains a valve formed by a plate 83 carried by a lever 84 pivoted at 85 and resting on the edge of an opening 86 through the dividing partition 80. A link 87 connects this lever to a plate 88 engaged by a spring 89 bearing against the plate 90 on the end of an adjusting screw 91 provided with an exterior bandwheel 92. The screw is threaded through the top of a housing 93 fixed on the body 79 and communicating through its bottom with the upper chamber 81. The top of the housing 93 is connected to the plate 88 by a bellows 94 defining a closed space, in which the spring 89 is isolated from the liquid filling the body, and which prevents any entry of air into the liquid through the threaded hole of the top. By operating the bandwheel the tension of the spring can be adjusted in such a manner that the valve opens and cancels any over pressure due to water hammer or shock due to closure of the downstream stop valve. It is understood that the quantity of liquid which returns to the chamber 7 is very small, the flow ceasing as soon as the over pressure is eliminated so that the device does not falsify the meter readings.

Although described as applied to an installation for the storage of fuel, the separator of this invention is suitable for all other applications. The flame arrester device provided at the air outlet can be used in a general fashion in all apparatus in which it is required to protect the contents of a receptacle containing an inflammable liquid and air against the transmission of an external flame through an air outlet opening. The invention is not limited, moreover, to the embodiments described and illustrated herein but is applicable to all equivalent constructions.

Having described my invention, I claim:

1. A separator for gas and liquid comprising a vessel, two inner horizontal, lower and upper vertically spaced partitions dividing said vessel into a lower liquid inlet chamber, a central separating chamber and an upper gas collecting chamber, a cylindrical vertical wall connecting said lower horizontal partition with the bottom wall of the liquid inlet chamber and forming in this latter chamber a vertical well, a liquid control valve mounted in the lower horizontal partition between the separating chamber and the liquid outlet well, gas and liquid separating means extending upwardly from said lower horizontal partition into the separating chamber and in communication with the lower liquid inlet chamber, a float mounted in said separating chamber and connected to said liquid control valve which is arranged to open when the float rises and to close when the float drops, and means in the top wall of the gas collecting chamber for allowing exhaust of the separated gas, the upper horizontal partition having apertures making communication between said central separating chamber and said gas collecting chamber.

2. A separator as claimed in claim 1, in which the means in the top wall of the gas collecting chamber comprises a hole, a liquid retaining filter covering the hole on the inside of the top wall, a flame trap arrangement covering the hole on the outside of the top wall, a gas control valve between the liquid retaining filter and the flame trap, and connecting means between this gas control valve and said float in the central separating chamber, said connecting means being arranged in a manner to close said gas control valve when the float reaches its high position and to open said gas control valve when the float is somewhat below said high position.

3. A separator as claimed in claim 1, in which said gas and liquid separating means, extending upwardly from said lower horizontal partition into the separating chamber, is formed of at least one stack of annular discs having their faces provided with shallow grooves which form narrow channels making communication between the inside of the stack and the separating chamber.

4. A separator as claimed in claim 2, in which said liquid retaining filter is formed of a stack of annular discs having their faces provided with shallow grooves which form narrow channels making communication between the separating chamber and the hole in the top wall of the gas collecting chamber.

5. A separator as claimed in claim 2, in which said flame trap arrangement is formed of a stack of annular discs having their faces provided with shallow grooves which form narrow channels making communication between the hole in the top wall of the gas collecting chamber and the free air.

References Cited in the file of this patent

UNITED STATES PATENTS

| | | |
|---|---|---|
| 1,183,513 | Ahola | May 16, 1916 |
| 1,941,390 | De Lancey | Dec. 26, 1933 |
| 2,555,452 | McIntyre | June 5, 1951 |